I. KEPLER.
Corn Sheller.
No. 6,382.
Patented April 24, 1849.
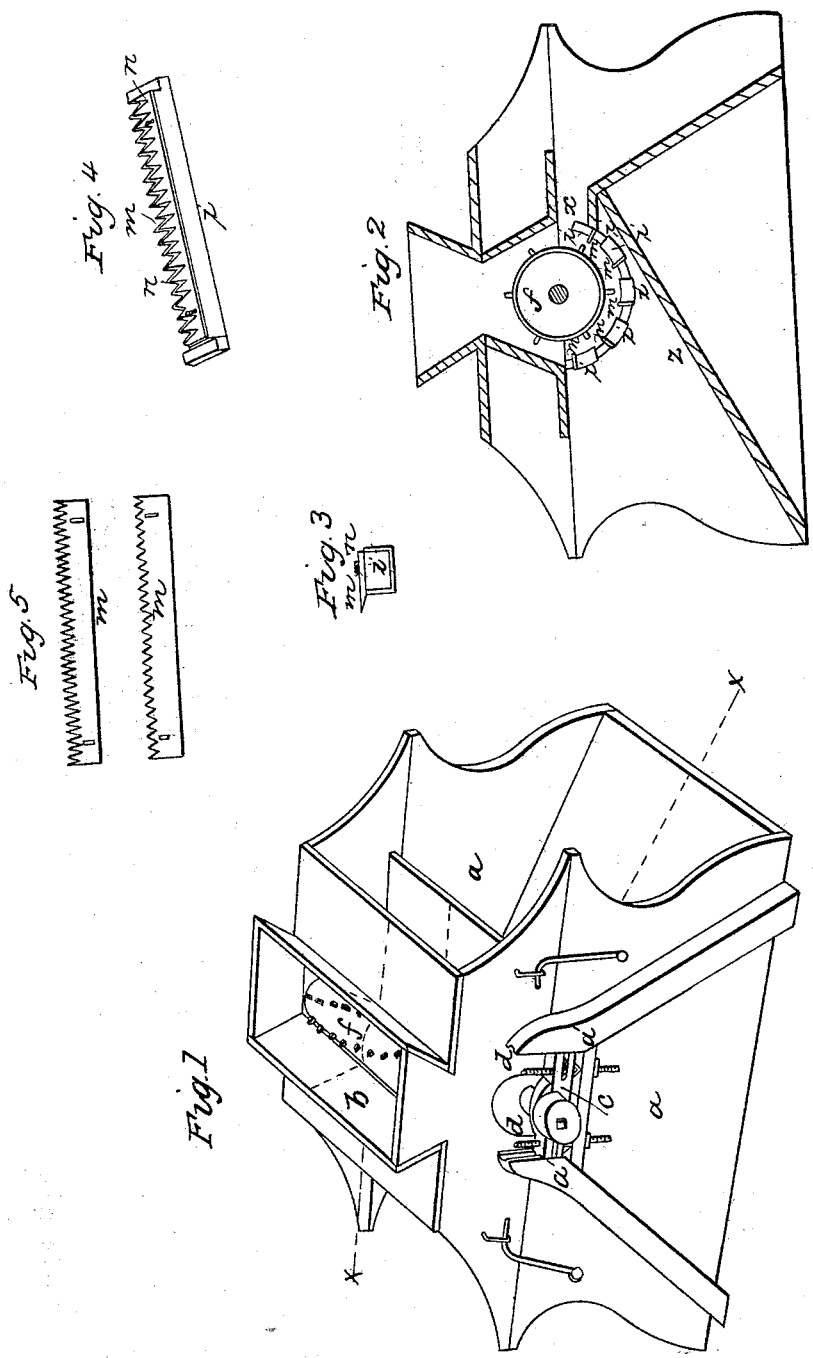

UNITED STATES PATENT OFFICE.

ISRAEL KEPLER, OF MILTON, PENNSYLVANIA.

CORN-SHELLER.

Specification of Letters Patent No. 6,382, dated April 24, 1849.

*To all whom it may concern:*

Be it known that I, ISRAEL KEPLER, of Milton, in the county of Northumberland and State of Pennsylvania, have invented certain new and useful Improvements in Corn-Shellers, of which the following is a full and exact description, reference being had to the annexed drawings of the same, making part of this specification, in which—

Figure 1 is a perspective view of the machine, Fig. 2 is a vertical section taken through the line $x\ x$ of Fig. 1, Fig. 3 is an end elevation, and Fig. 4 is a perspective view of one of the segments or bars of the concave, detached from the machine, and Fig. 5 is a view of two forms of the adjustable toothed shelling plates.

The same letters indicate the same parts in all the figures.

It is well known that when the corn shellers in common use, are new, and their teeth sharp, they act with considerably greater efficiency, shelling the corn easier and more thoroughly, than they do afterwards when the teeth become blunted by use, in the former case the corn is scratched or picked from the cobs, in the latter it is jammed off. With these facts in view I have constructed a machine upon such principles that when the teeth become dulled and worn down by use, they can be sharpened and set up again, and are thus easily kept in the most efficient working condition.

In the accompanying drawings $a$ the frame of the machine is made of scantling boards, and other suitable materials, in form somewhat resembling the cylinder frame of a common threshing machine. Upon the top of this frame a hopper $b$ is placed to contain the ears of corn to be shelled. The upper ends of the adjacent sides of each pair of legs $a'$ are parallel, and grooved, for the purpose of holding and guiding the adjustable pillow blocks $c$ upon which the axis of the cylinder turns, these pillow blocks are supported by the bolts $d\ d$ which pass through them at either end, and on which they are raised or lowered by the nuts $e\ e$ which turn in horizontal grooves or notches formed in the ends of the blocks; this is an accurate, efficient, and cheap mode of raising, lowering, and adjusting the cylinder, which is shown at $f$, and may be made of any suitable material of any convenient size, with a spiked, fluted, or roughened surface, and is mounted upon an axis as represented, one end of which axis projects beyond the frame to receive a pulley or cog wheel by which to turn the cylinder; the motion being communicated from any convenient or available first mover.

The concave which extends about half way around the cylinder and at a suitable distance therefrom, is composed of bars of wood $i$ Fig. 2 covered with iron, or of other material, these bars are placed at such distance apart as will admit of the corn passing down between them, while they retain the cobs which pass on, and are discharged at the end of the concave through the aperture, the corn dropping down between the bars $i$ and running down the apron $z$ discharged at the oposite end of the machine. The bars thus performing the double office of concave and screen; upon one side of each of these bars or segments of the concave a toothed metallic plate $m$ is fastened by screws $n$ passing through transverse slots in the same, which slots admit of the plates being set at a greater or less distance from the cylinder as circumstances may require. The teeth of these plates may be made like those of a saw, sickle, or otherwise, at the option of the constructor.

Whenever the teeth are broken off by accident, or become dull from use, the plates are removed, the teeth filed, ground, or otherwise sharpened, and adjusted, and then replaced again in the proper position. Or if the plate is too badly broken to be repaired it is thrown aside, and replaced by a new one. These plates being the only portion of the machine that wears rapidly the facility of sharpening and keeping them in good order adds greatly to the durability of the machine, which with ordinary good care will last an indefinite period.

What I claim as my invention and desire to secure by Letters Patent is—

The combination of the adjustable toothed shelling plates ($m$) with the fixed bars or segments ($i$) to form a toothed concave, within which, a spiked, fluted, or roughened cylinder revolves, for the purpose of shelling corn, the whole being arranged and operated in the manner herein set forth.

In testimony whereof I have hereunto signed my name in presence of two witnesses.

ISRAEL KEPLER.

Witnesses:
J. D. STOUGHTON,
D. PLANTS,
JNO. MILLER.